United States Patent
Hershman et al.

(10) Patent No.: US 10,776,527 B2
(45) Date of Patent: Sep. 15, 2020

(54) SECURITY MONITORING OF SPI FLASH

(71) Applicant: Nuvoton Technology Corporation, Hsin-chu (TW)

(72) Inventors: Ziv Hershman, Givat Shmuel (IL); Yoel Hayon, Givatayim (IL); Natan Keren, Kfar Saba (IL); Moshe Alon, Tel-Aviv (IL)

(73) Assignee: NUVOTON TECHNOLOGY CORPORATION, Hsin-Chu (TW)

(*) Notice: Subject to any disclaimer, the term of this patent is extended or adjusted under 35 U.S.C. 154(b) by 0 days.

(21) Appl. No.: 16/568,299

(22) Filed: Sep. 12, 2019

(65) Prior Publication Data
US 2020/0004994 A1 Jan. 2, 2020

Related U.S. Application Data

(63) Continuation-in-part of application No. 15/955,715, filed on Apr. 18, 2018, now Pat. No. 10,452,582, which is a continuation-in-part of application No. 15/075,219, filed on Mar. 21, 2016, now Pat. No. 10,095,891.

(60) Provisional application No. 62/172,298, filed on Jun. 8, 2015.

(51) Int. Cl.
G06F 13/362 (2006.01)
G06F 13/42 (2006.01)
G06F 21/85 (2013.01)
G06F 21/60 (2013.01)
G06F 13/16 (2006.01)

(52) U.S. Cl.
CPC .......... *G06F 21/85* (2013.01); *G06F 13/1668* (2013.01); *G06F 13/4282* (2013.01)

(58) Field of Classification Search
None
See application file for complete search history.

(56) References Cited

U.S. PATENT DOCUMENTS

| 5,713,006 A * | 1/1998 | Shigeeda ............... G06F 1/1616 710/8 |
| 6,088,450 A | 7/2000 | Davis et al. |
| 6,832,317 B1 | 12/2004 | Strongin et al. |
| 7,065,654 B1 | 6/2006 | Gulick et al. |

(Continued)

OTHER PUBLICATIONS

National Institute of Standards and Technology, "Implementation Guidance for FIPS 140-2 and the Cryptographic Module Validation Program", pp. 1-252, Mar. 28, 2003.

(Continued)

*Primary Examiner* — Michael Sun
(74) *Attorney, Agent, or Firm* — Kligler & Associates Patent Attorneys LTD

(57) ABSTRACT

A security device includes an interface and a processor. The interface is configured for connecting to a bus that serves one or more peripheral devices, at least one of the peripheral devices being a memory device. The processor is connected to the bus in addition to the peripheral devices, and is configured to hold a definition that distinguishes between authorized and unauthorized transactions with the memory device, to identify on the bus a transaction in which a bus-master device attempts to access the memory device, and to initiate a responsive action in response to identifying that the transaction is unauthorized in accordance with the definition.

29 Claims, 6 Drawing Sheets

(56) References Cited

U.S. PATENT DOCUMENTS

| | | | |
|---|---|---|---|
| 7,155,615 B1* | 12/2006 | Silvester | G06F 21/80 713/185 |
| 7,205,883 B2 | 4/2007 | Bailey | |
| 7,664,836 B2 | 2/2010 | Kim | |
| 8,782,434 B1 | 7/2014 | Ghose | |
| 9,239,925 B2 | 1/2016 | Cumming et al. | |
| 2005/0204162 A1* | 9/2005 | Rayes | H04L 61/2061 726/5 |
| 2006/0059360 A1 | 3/2006 | Ortkiese | |
| 2008/0177994 A1 | 7/2008 | Mayer | |
| 2012/0210115 A1 | 8/2012 | Park et al. | |
| 2012/0255012 A1* | 10/2012 | Sallam | H04L 63/145 726/24 |
| 2016/0188909 A1* | 6/2016 | Zatko | G06F 21/31 726/26 |
| 2017/0206034 A1* | 7/2017 | Fetik | H04L 67/1097 |
| 2017/0364700 A1* | 12/2017 | Goldfarb | G06F 21/6218 |
| 2019/0236278 A1 | 8/2019 | Martinez et al. | |

OTHER PUBLICATIONS

National Institute of Standards and Technology, "Security Requirements for Cryptographic Modules", FIPS PUB 140-2, pp. 1-69, May 25, 2001.

National Institute of Standards and Technology, "Secure Hash Standard (SHS)", FIPS PUB 180-4, pp. 1-36, Aug. 2015.

National Institute of Standards and Technology, "The Keyed-Hash Message Authentication Code (HMAC)", FIPS PUB 198-1, pp. 1-13, Jul. 2008.

Unified EFI Forum, Inc., "Unified Extensible Firmware Interface (UEFI) Specification", version 2.7, errata A, pp. 1-41 (chapter 8.2—pp. 237-259, chapter 23.1—pp. 1001-1016), Aug. 2017.

Unified EFI Forum, Inc., "Unified Extensible Firmware Interface (UEFI) Specification", version 2.7, errata A, pp. 1-36 (chapter 31—pp. 1697-1730), Aug. 2017.

U.S. Appl. No. 16/377,212 office action dated Oct. 18, 2019.

WINBOND—SPIFLASH, "3V 256M-BIT, Serial Flash Memory With Dual/Quad SPI & QPI", pp. 1-104, Nov. 13, 2015.

* cited by examiner

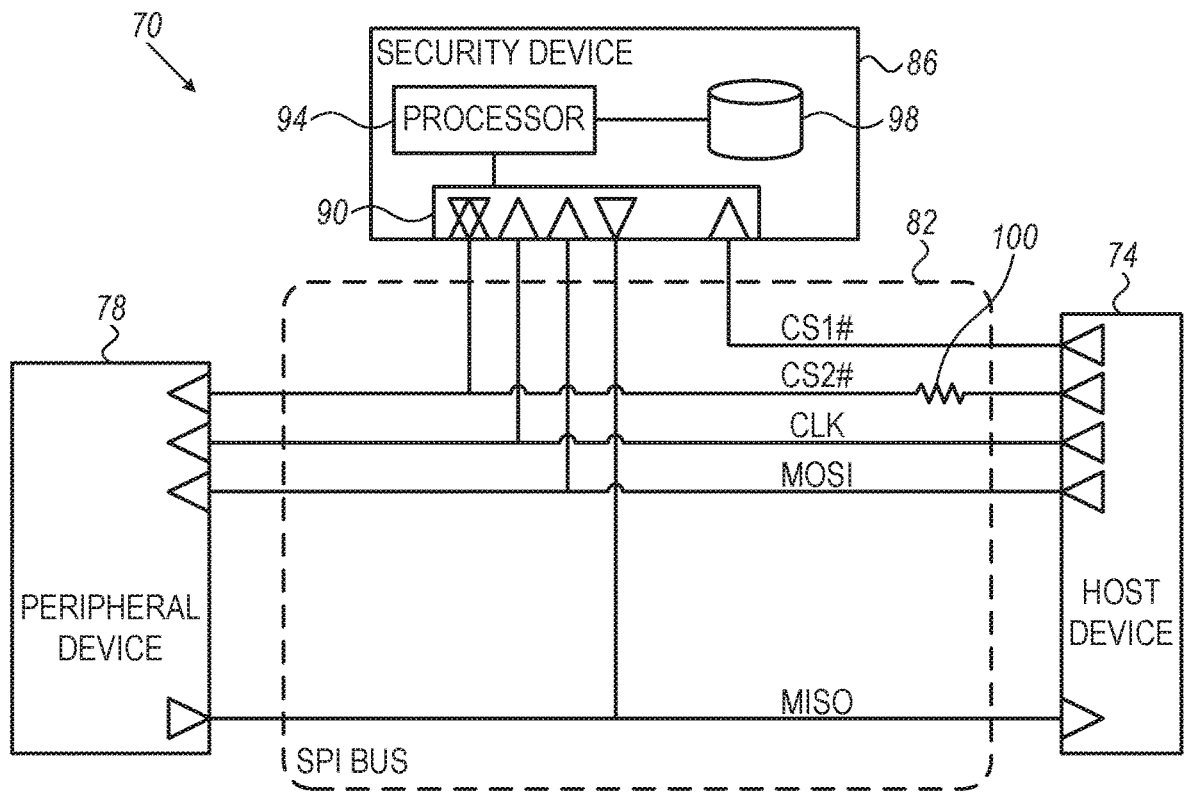
FIG. 3
FIG. 4
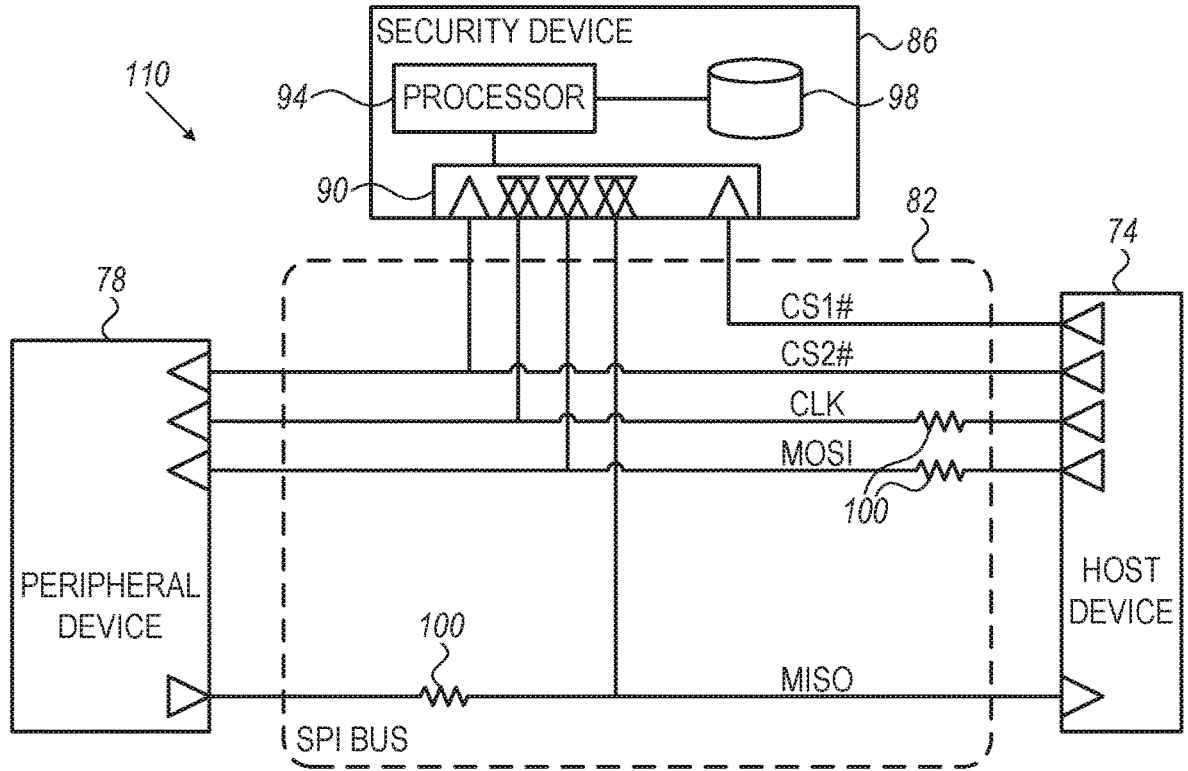

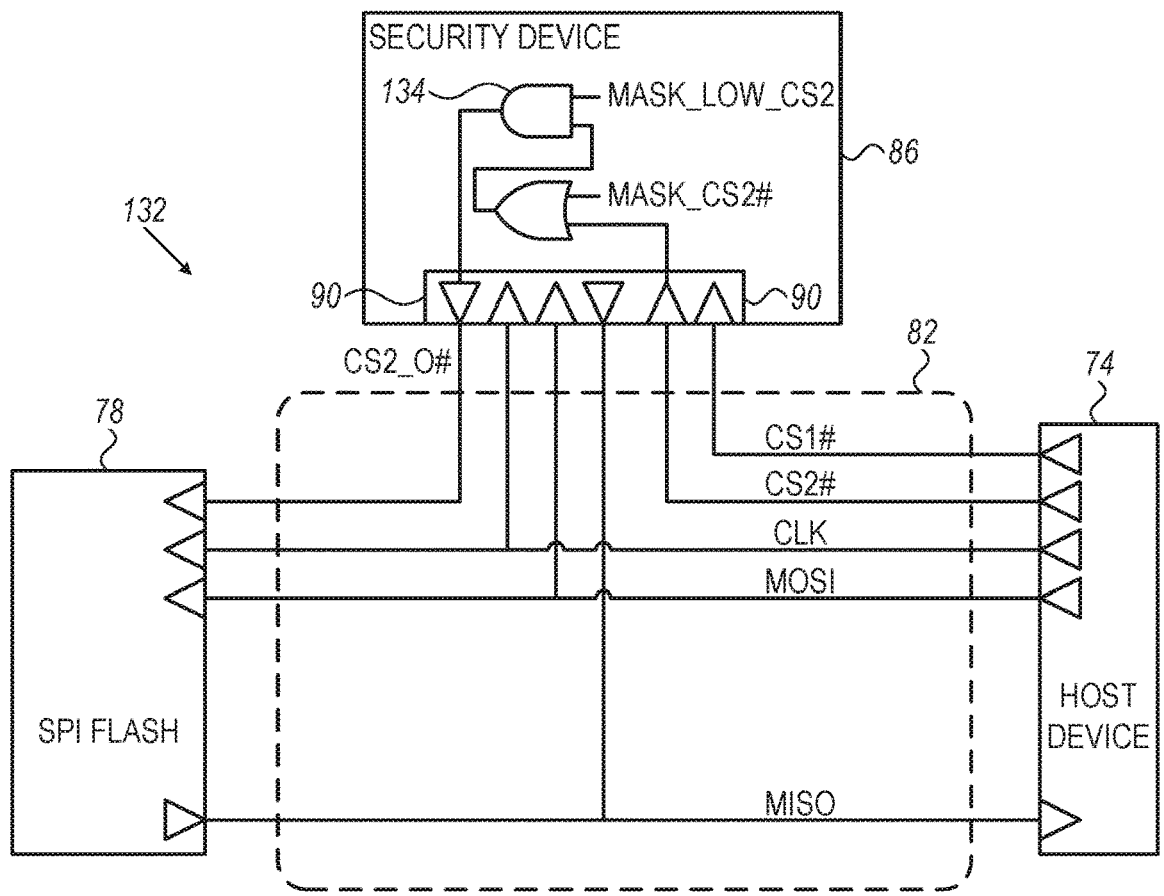
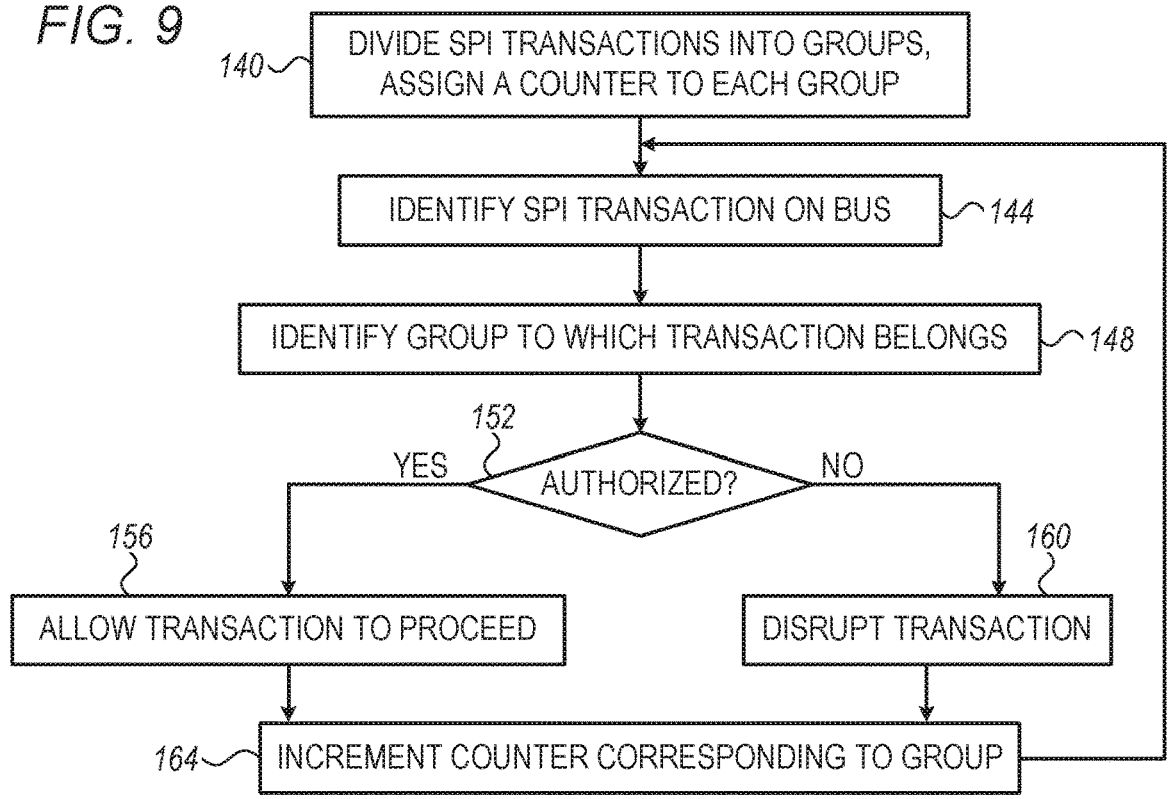
FIG. 8
FIG. 9

US 10,776,527 B2

SECURITY MONITORING OF SPI FLASH

CROSS-REFERENCE TO RELATED APPLICATIONS

This application is a Continuation-In-Part (CIP) of U.S. patent application Ser. No. 15/955,715, filed Apr. 18, 2018, which is a CIP of U.S. patent application Ser. No. 15/075, 219, filed Mar. 21, 2016, which claims the benefit of U.S. Provisional Patent Application 62/172,298, filed Jun. 8, 2015. The disclosures of these related applications are incorporated herein by reference.

FIELD OF THE INVENTION

The present invention relates generally to electronic-system security, and particularly to methods and systems for securing access to peripheral devices.

BACKGROUND OF THE INVENTION

Electronics systems use various types of bus interfaces for communicating between host devices and peripheral devices. Examples of bus interfaces include the Inter-Integrated-Circuit $I^2C$ bus and the Serial Peripheral Interface (SPI) bus. The $I^2C$ bus is specified, for example, in "$I^2C$ bus specification and user manual," UM10204, NXP Semiconductors, revision 6, Apr. 4, 2014, which is incorporated herein by reference.

SUMMARY OF THE INVENTION

An embodiment of the present invention that is described herein provides a security device including an interface and a processor. The interface is configured for connecting to a bus that serves one or more peripheral devices, at least one of the peripheral devices being a memory device. The processor is connected to the bus in addition to the peripheral devices, and is configured to hold a definition that distinguishes between authorized and unauthorized transactions with the memory device, to identify on the bus a transaction in which a bus-master device attempts to access the memory device, and to initiate a responsive action in response to identifying that the transaction is unauthorized in accordance with the definition.

In some embodiments, the bus includes (i) one or more dedicated signals that are each dedicated to a respective one of the peripheral devices, and (ii) one or more shared signals that are shared among the peripheral devices served by the bus, and the processor is configured to disrupt the transaction on the bus by disrupting a dedicated signal associated with the memory device. In some embodiments, the dedicated signal is a Chip Select (CS) signal of the memory device, and the processor is configured to disrupt the transaction by extending a duration in which the CS signal selects the memory device, beyond an actual end of the transaction, thereby causing the memory device to refrain from executing the transaction.

In an example embodiment, the definition specifies the authorized transactions with the memory device, and the processor is configured to initiate the responsive action in response to identifying that the transaction is not specified in the definition.

In an embodiment, the processor is configured to define one or more groups of transactions, to maintain one or more counters corresponding respectively to the groups, to monitor the bus, and, in response to identifying on the bus a given transaction between the bus-master device and the memory device, to increment a counter corresponding to a group to which the given transaction belongs.

In some embodiments, the processor is configured to identify whether or not the memory device is operating in a given operational mode, by identifying on the bus one or more mode-entry transactions that instruct the memory device to enter a given operational mode, and one or more mode-exit transactions that instruct the memory device to exit the given operational mode. In a disclosed embodiment, the processor is configured to apply a first interpretation to one or more transactions when the memory device is operating in the given operational mode, and to apply a different second interpretation to the one or more transactions when the memory device is not operating in the given operational mode. In another embodiment, the processor is configured to suspend initiation of responsive actions when the memory device is operating in the given operational mode.

In an embodiment, the processor is configured to receive the transaction from the bus-master device, to verify whether the transaction is authorized, and, upon deciding that the transaction is authorized, to execute the transaction in the memory device. The processor may be configured to receive the transaction as part of a sequence of transactions, and to verify whether the transaction is authorized as part of jointly verifying that the sequence of transactions is authorized.

In another embodiment, the transaction is a write transaction in which the bus-master device writes data to the memory device, and the processor is configured to perform a cryptographic operation on the data, and to decide that the transaction is authorized in response to a success of the cryptographic operation.

There is additionally provided, in accordance with an embodiment of the present invention, a security device including an interface and a processor. The interface is configured for connecting to a bus that serves one or more peripheral devices, at least one of the peripheral devices being a memory device. The processor is connected to the bus in addition to the peripheral devices and is configured to identify on the bus a transaction in which a bus-master device attempts to access the memory device, to initiate a responsive action upon identifying the transaction, and to respond to the bus-master device instead of the given peripheral device.

In an embodiment, upon identifying the transaction, the processor is configured to disrupt the transaction on the bus. Additionally or alternatively, the processor is configured to issue an alert upon identifying the transaction.

In some embodiments, the transaction is a query for capabilities of the memory device, and the processor is configured to respond to the bus-master device with modified capabilities that are different from actual capabilities of the memory device. In an embodiment, the query includes a Serial Flash Discoverable Parameters (SFDP) read command, and the processor is configured to respond to the SFDP read command with modified SFDP.

In an embodiment, the processor is configured to obtain the actual capabilities from the memory device prior to the query from the bus-master device, and to modify the actual capabilities so as to produce the modified capabilities for responding to the bus-master device. In an example embodiment, the processor is configured to add to the modified capabilities a capability that is not supported by the memory device. Additionally or alternatively, the processor may be configured to omit from the modified capabilities a capability that is supported by the memory device.

There is also provided, in accordance with an embodiment of the present invention, a security method, including communicating over a bus using a security device, which is connected to the bus in addition to one or more peripheral devices, at least one of the peripheral devices being a memory device. A definition, which distinguishes between authorized and unauthorized transactions with the memory device, is held in the security device. A transaction, in which a bus-master device attempts to access the memory device, is identified on the bus using the security device. A responsive action is initiated in response to identifying that the transaction is unauthorized in accordance with the definition.

There is further provided, in accordance with an embodiment of the present invention, a security method, including communicating over a bus using a security device, which is connected to the bus in addition to one or more peripheral devices, at least one of the peripheral devices being a memory device. Using the security device, an identification is made of a transaction on the bus in which a bus-master device attempts to access the memory device. A responsive action is initiated upon identifying the transaction, and the bus-master device is responded to by the security device instead of the given peripheral device.

An embodiment of the present invention that is described herein provides a security device including an interface and a processor. The interface is configured for connecting to a bus that serves one or more peripheral devices. The bus includes (i) one or more dedicated signals that are each dedicated to respective one of the peripheral devices, and (ii) one or more shared signals that are shared among the peripheral devices served by the bus. The processor is connected to the bus as an additional device in addition to the peripheral devices, and is configured to disrupt on the bus a transaction in which a bus-master device attempts to access a given peripheral device, by disrupting a dedicated signal associated with the given peripheral device.

In some embodiments, the processor is configured to retain the shared signals on the bus uninterrupted while disrupting the transaction. In an embodiment, the interface includes (i) an input for receiving the dedicated signal from the bus-master device and (ii) an output for sending the dedicated signal to the given peripheral device, and the processor is configured to disrupt the transaction by preventing the dedicated signal received at the input from being sent on the output. In some embodiments, the processor is configured to respond to the bus-master instead of the given peripheral device, while the dedicated signal is disrupted. In an example embodiment, the dedicated signal includes a Chip-Select (CS) signal.

In a disclosed embodiment, the processor is configured to detect the transaction to be disrupted, by monitoring the bus. In an alternative embodiment, the processor is configured to detect the transaction to be disrupted, by communicating with the bus-master device over an auxiliary interface that is external to the bus.

In an embodiment, the processor is configured to disrupt the dedicated signal indefinitely, until a reset. In another embodiment, the processor is configured to disrupt the dedicated signal for a finite time period after detecting the transaction. In an embodiment, by disrupting the transaction, the processor is configured to cause a transaction abort at one or more of the peripheral devices. In some embodiments, the processor is configured to resume normal operation of the bus following disruption of the transaction.

There is additionally provided, in accordance with an embodiment of the present invention, a security device including an interface and a processor. The interface is configured for connecting to a bus that serves one or more peripheral devices. The processor is connected to the bus in addition to the peripheral devices and is configured to disrupt on the bus a transaction in which a bus-master device attempts to access a given peripheral device, by responding to the bus-master instead of the given peripheral device.

In an embodiment, the bus includes (i) one or more dedicated signals that are each dedicated to a respective one of the peripheral devices, and (ii) one or more shared signals that are shared among the peripheral devices served by the bus, and the processor is configured to disrupt the transaction by (i) disrupting a dedicated signal associated with the given peripheral device, and (ii) responding to the bus-master while the dedicated signal is disrupted.

In some embodiments, the given peripheral device includes a memory device, and the processor is configured to identify, in the transaction, a request from the bus-master to read data from the memory device, and to respond to the request with alternative data stored internally in the security device. In an example embodiment, the processor is configured to disrupt the transaction and respond with the alternative data in response to identifying that the bus-master is requesting to access a predefined address zone in the memory device.

In another embodiment, the processor is configured to identify the transaction, in which the bus-master device attempts to access the given peripheral device, based on data returned by the given peripheral device to the bus-master during the transaction. In yet another embodiment, the processor is configured to identify the transaction, in which the bus-master device attempts to access the given peripheral device, based on a command code used in the transaction.

There is also provided, in accordance with an embodiment of the present invention, a method including communicating over a bus using a security device, which is connected to the bus as an additional device in addition to one or more peripheral devices, wherein the bus includes (i) one or more dedicated signals that are each dedicated to a respective one of the peripheral devices, and (ii) one or more shared signals that are shared among the peripheral devices served by the bus. A transaction, in which a bus-master device attempts to access a given peripheral device, is disrupted on the bus using the security device, by disrupting a dedicated signal associated with the given peripheral device.

There is further provided, in accordance with an embodiment of the present invention, a method including communicating over a bus using a security device, which is connected to the bus in addition to one or more peripheral devices. A transaction, in which a bus-master device attempts to access a given peripheral device, is disrupting on the bus using the security device, by responding to the bus-master instead of the given peripheral device.

Another embodiment of the present invention that is described herein provides an apparatus including an interface and a processor. The interface is configured for communicating over a bus. The processor is configured to disrupt on the bus a transaction in which a bus-master device attempts to access a peripheral device without authorization, by forcing one or more dummy values on at least one line of the bus in parallel to at least a part of the transaction.

In an embodiment, the processor is configured to force the dummy values on a data line of the bus, so as to disrupt transfer of respective data values that are sent to or received from the peripheral device on the data line. Additionally or alternatively, the processor is configured to force the dummy values on a clock line of the bus, so as to disrupt a clock signal used in the transaction. Further additionally or alternatively, the processor is configured to force the dummy values on a chip-select line of the bus, so as to disrupt selection of the peripheral device by the bus-master device.

In some embodiments, the bus includes an open-drain or open-collector bus having a default logical value, and the processor is configured to force the dummy values by writing an opposite of the default logical value on the at least one line of the bus.

In some embodiments, by forcing the dummy values, the processor is configured to override corresponding values that are written on the at least one line by the bus-master device or by the peripheral device. In an example embodiment, the processor is configured to override the values written by the bus-master device or by the peripheral device, by driving the at least one line with a drive strength that is stronger than the drive strength of the bus-master device or the peripheral device. In other embodiments, the apparatus includes at least one resistor, which is inserted in the at least one line and is configured to attenuate the values written by the bus-master device or by the peripheral device, relative to the dummy values written by the processor.

In some embodiments, the processor is configured to force the dummy values using only existing lines of the bus that are used for communicating between the bus-master device and the peripheral device. In some embodiments, the processor is configured detect the transaction to be disrupted, by monitoring the bus. In an embodiment, the processor is configured detect the transaction to be disrupted, by communicating with the bus-master device over an auxiliary interface that is external to the bus.

In a disclosed embodiment, the processor is configured to force the dummy values indefinitely, until the apparatus is reset. In another embodiment, the processor is configured to force the dummy values for a finite time period after detecting the transaction. In an embodiment, the processor is configured to gracefully resume normal operation of the bus following disruption of the transaction.

There is additionally provided, in accordance with an embodiment of the present invention, a system including a peripheral device and a security device. The peripheral device is accessible to one or more bus-master devices over a bus. The security device is configured to disrupt on the bus a transaction in which a bus-master device attempts to access the peripheral device without authorization, by forcing one or more dummy values on at least one line of the bus in parallel to at least a part of the transaction.

There is further provided, in accordance with an embodiment of the present invention, a method including, using a security device coupled to a bus, deciding to disrupt a transaction in which a bus-master device attempts to access a peripheral device without authorization. The transaction is disrupted by forcing one or more dummy values on at least one line of the bus in parallel to at least a part of the transaction.

The present invention will be more fully understood from the following detailed description of the embodiments thereof, taken together with the drawings in which:

BRIEF DESCRIPTION OF THE DRAWINGS

FIGS. 3-5 are block diagrams that schematically illustrate secured systems in which multiple devices communicate over an SPI bus, in accordance with alternative embodiments of the present invention;

FIG. 8 is a block diagram that schematically illustrates a secured system in which multiple devices communicate over an SPI bus, in accordance with another embodiment of the present invention;

FIG. 9 is a flow chart that schematically illustrates a method for monitoring SPI transactions using transaction-group counters, in accordance with an embodiment of the present invention.

DETAILED DESCRIPTION OF EMBODIMENTS

Overview

Figure 1:
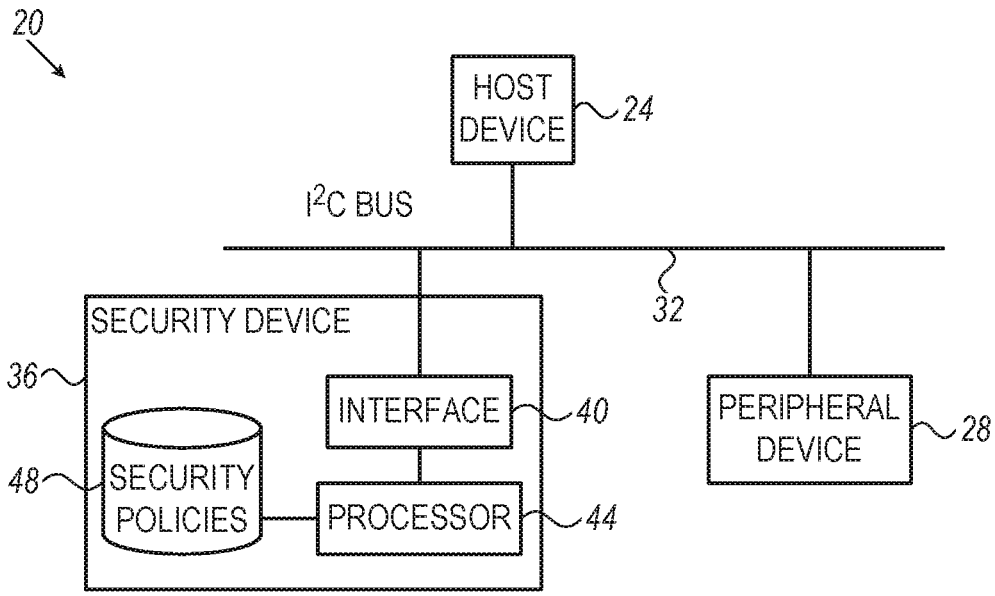
FIG. 1 is a block diagram that schematically illustrates a secured system in which multiple devices communicate over an $I^2C$ bus, in accordance with an embodiment of the present invention.

Embodiments of the present invention that are described herein provide improved methods and devices for securing access to peripheral devices over bus interfaces. Peripheral devices may comprise, for example, cryptographic engines, memory devices that store sensitive data, or any other suitable device that is accessible over a bus. Some of the embodiments described herein refer mainly to serial Flash memory devices, but the disclosed techniques are not limited to any particular type of peripheral device.

In some disclosed embodiments, a security device monitors the transactions on the bus, and identifies unauthorized transactions in which a host device or other bus-master device attempts to access the peripheral device without authorization. Transactions may be classified as authorized or unauthorized using any suitable criterion or policy.

Upon identifying an unauthorized transaction, the security device disrupts the transaction by deliberately forcing the values of one or more lines or signals of the bus to some dummy values, in parallel to the transaction. Forcing of dummy values may be performed, for example, on a clock signal, a data signal and/or a chip-select (CS) signal.

Disruption of transactions by forcing dummy values on the bus is suitable, for example, for open-drain or open-collector buses such as $I^2C$, as well as for push-pull buses such as SPI. Forcing dummy values on the bus in parallel to the transaction overrides the communication to and/or from the peripheral device, and/or disrupts the respective clock signal.

Several example techniques for disrupting unauthorized transactions on $I^2C$ and SPI buses are described herein. Techniques for gracefully resuming normal operation following the disruption are also described. In some embodiments, the security device may disrupt a transaction without first detecting it on the bus, or even without monitoring the bus at all. For example, the security device may force dummy values on the chip-select (CS) line of a certain host, until or unless this host is authorized.

In some embodiments, e.g., in SPI, the bus protected by the security device comprises (i) one or more dedicated signals that are each dedicated to a respective peripheral device, and (ii) one or more shared signals that are shared among the peripheral devices served by the bus. Examples of shared signals are data and clock signals. Examples of dedicated signals are CS signals. In some embodiments, the security device is configured to disrupt the transaction by disrupting a dedicated signal associated with the protected peripheral device, while retaining the shared signals on the bus uninterrupted. Note, however, that not all buses have dedicated signals. In I²C, for example, all signals of the bus are shared signals.

In other embodiments, the security device is configured to disrupt the transaction by responding to the unauthorized host instead of the protected peripheral device. In an example embodiment, the peripheral device comprises a Flash memory containing one or more address zones allocated for storing sensitive data such as keys, configuration data and/or boot code. By selectively overriding the CS signal of the Flash memory, the security device is able to override access to this data at the Flash memory. Instead, the security device responds to the host with data stored internally at the security device. A secure boot process of this sort is described herein.

The disclosed techniques provide secure selective access to peripheral devices in real-time, on a transaction-by-transaction level. In most of the techniques described herein, both identification and disruption of transactions are performed solely using the existing signals of the bus. As such, the disclosed techniques do not require additional pins or interconnection, thereby reducing overall system size and cost.

Securing Access to Peripheral Device Over I²C Bus

FIG. 1 is a block diagram that schematically illustrates a secured system 20, in accordance with an embodiment of the present invention. In the present example, system 20 comprises host device 24 and a peripheral device 28 that are both connected to an I²C bus 32. Host device 24 and peripheral device 28 are also referred to herein as host and peripheral, for brevity. Host 24 is also sometimes referred to as a bus master.

A security device 36 protects the access to peripheral 28, by monitoring the transactions on the I²C bus and preventing unauthorized transactions in which host 24, or another device having bus-master capabilities, attempts to access peripheral 28 without authorization. Security device 36 is also sometimes referred to as a control device or Trusted Platform Module (TPM). In the present example, security device 36 comprises an interface 40 for connecting to I²C bus 32, a processor 44 that is configured to carry out the disclosed techniques, and a memory 48 that is configured to store one or more security policies enforced by processor 44.

Processor 44 may classify a transaction as unauthorized in accordance with any predefined or configured policy. Generally, an unauthorized transaction may attempt to write data to the peripheral, read data from the peripheral, configure or send a command to the peripheral, or access the peripheral in any other suitable way. The policy enforced by the security device may comprise a positive policy (e.g., "whitelist"), a negative policy (e.g., a "blacklist"), a policy that depends on the device address or register offset, or any other type of policy.

For example, the host may be required to authenticate its identity to the security device before it is authorized to access the peripheral. A transaction attempted by a non-authorized host may be considered unauthorized. Authentication may be carried out, for example, using some challenge-response process between the host and the security device. Additionally or alternatively, the host may be required to prove its identity in some other suitable manner, or to successfully complete a secure boot process.

Further additionally or alternatively, some types of transactions (e.g., read transactions) may be regarded as authorized, whereas other types of transactions (e.g., write transactions) may be regarded as unauthorized. As yet another example, access to selected addresses in the peripheral may be regarded as authorized, whereas access to other addresses may be regarded as unauthorized. As another example, some bit sequences over the bus may be indicative of an unauthorized transaction.

Generally, processor 44 may distinguish between authorized and unauthorized transactions in any suitable way. The policy or policies for distinguishing between authorized and unauthorized transactions are stored in memory 48.

I²C bus 32 comprises a Serial Data (SDA) line that conveys a serial data signal, and a Serial Clock (SCL) line that carries a serial clock signal. The terms "line" and "signal" are used interchangeably herein. By monitoring the SDA and SCL lines, processor 44 is able to monitor any transaction exchanged over the I²C bus and to identify unauthorized transactions.

Upon identifying an unauthorized transaction, processor 44 disrupts the transaction by forcing one or more dummy values on the DSA and/or SCL lines of I²C bus 32. This mechanism is possible because of the open-drain/open-collector structure of the I²C bus. Typically, both the SDA and SCL lines are by default pulled-up to a state of logical "1" using pull-up resistors. Any device can force a logical "0" on the SDA or SCL line at any time by writing a "0" value, regardless of values that may be written concurrently by other devices.

Thus, in some embodiments, upon identifying an unauthorized transaction, processor 44 of security device 36 forces a logical "0" (the opposite of the default "1" logical value) on the SDA or SCL line of bus 32 using interface 40. The "0" value is regarded as a dummy value this context. A "0" value forced on the SDA line overrides any data value that is currently being written from host 24 to peripheral 28, or read by host 24 from peripheral 28, or the default "1" value. A "0" value forced on the SCL line halts the clock signal. In either case, the transaction is disrupted.

In some embodiments, processor 44 continues to force the "0" value indefinitely, e.g., until power-up reset is performed. In other embodiments, processor 44 allows graceful recovery from the disruption, i.e., allows host and peripheral 28 to recover from the disrupted transaction and resume normal operation. Some hosts and/or peripherals are incapable of recovering from a clock stall. Thus, if graceful recovery is desired even for simple hosts and peripheral devices, it may be preferable to force dummy values on the SDA line and not on the SCL line.

In an embodiment, in order to resume normal operation after disrupting a transaction, processor 44 generates an I²C STOP or RESTART condition on the bus. In the present context, an I²C STOP or RESTART condition may comprise any sequence of bus signal values that indicates to the devices that the bus is free for initiating transactions.

Processor 44 may use various techniques for allowing graceful recovery from a disrupted transaction. In one embodiment, processor 44 forces the "0" value only for a predefined time duration, which is regarded sufficient for disrupting the unauthorized transaction. Any predefined time duration can be used. For example, the SMBus specification defines a time-out of 25 mS. Therefore, in applications of SMBus-over-I²C it makes sense to set the predefined time duration to at least 25 mS, so as to trigger the time-out.

In another embodiment, processor 44 forces a "0" value on the SDA line until detecting that the SCL line is high (i.e., not toggling) for at least a predefined time period. This condition may indicate that the host terminated or aborted the transaction. Processor 44 may then release the SDA line, and possibly generate an I²C STOP condition.

In yet another embodiment, useful for disrupting transactions that read from the peripheral device, security device 36 is configured as an I²C slave having the same device address as peripheral 28. Processor 44 of security device 36 responds to any unauthorized read request with "0" data values. Peripheral 28 will also respond to these read requests in parallel to processor 44, but the data values it sends will be masked by the "0" values sent from security device 36. This process typically continues until the host terminates the transaction, e.g., by a STOP condition. Note that, in accordance with the I²C specification, an I²C slave does not drive the ACK/NEGACK bit when transmitting data.

In another embodiment, useful for disrupting both read and write transactions, processor 44 forces "0" values on the SDA line. Then, if host 24 does not recognize the disruption, the transaction terminates normally with "0" data on the bus instead of the data send from peripheral 28. If host 24 detects the disruption (e.g., because it supports I²C multi-master arbitration) and aborts the transaction, processor 44 may take over the transaction that was aborted by host 24, typically by generating additional clock cycles on the SCL line. Processor 44 may then complete the current byte being transferred, and terminate the transaction by issuing a STOP condition.

The disruption and recovery techniques described above are depicted purely by way of example. In alternative embodiments, processor 44 of security device 36 may use any other suitable technique for disrupting transactions and/or for allowing graceful recovery from the disruption.

In the examples above, detection of unauthorized transactions, disruption of transactions, and recovery following the disruption, are all implemented using only the existing lines of the bus. In alternative embodiments, security device 36 and host 24 are also connected by some auxiliary interface that is external to bus 32. This mechanism is feasible, for example, when security device 36 and host 24 are integrated in the same Integrated Circuit (IC) and share the SDA and SCL pins of the IC.

In these embodiments, security device 36 and host 24 use the auxiliary interface for verifying that no other host device accesses peripheral device 28. In an example embodiment, host 24 notifies security device 36, over the auxiliary interface, whenever it accesses peripheral 28. In response to the notification, processor 44 does not force dummy "0" values on the bus and allows the transaction to take place. Upon detecting a transaction that accesses peripheral 28 but was not reported on the auxiliary interface, processor 44 assumes that this transaction is issued by some unauthorized host, and disrupts it by forcing "0" values.

Figure 2:
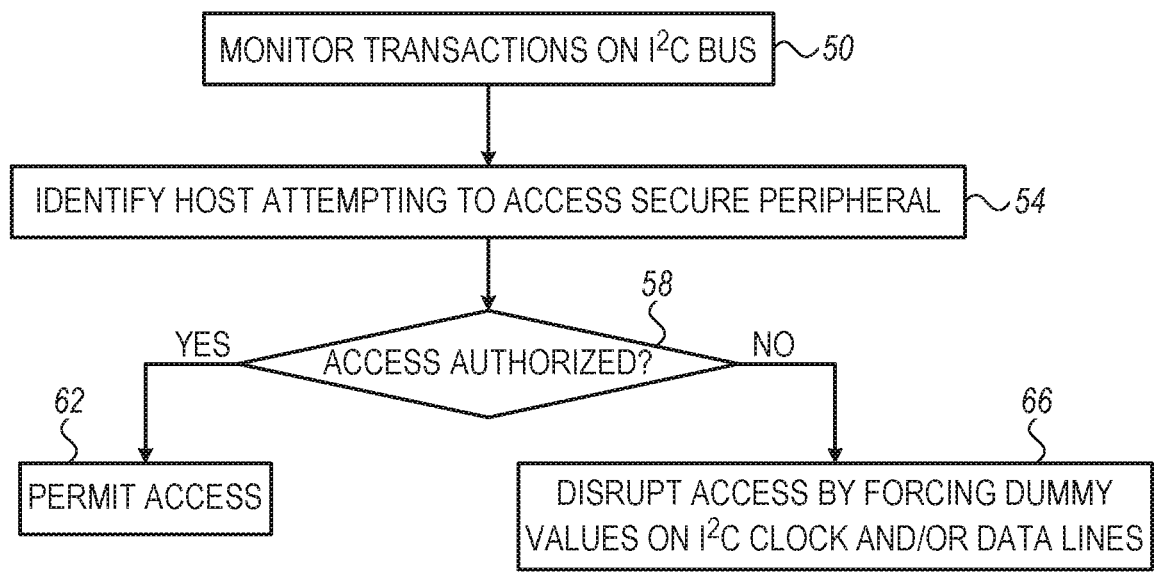
FIG. 2 is a flow chart that schematically illustrates a method for securing access to a peripheral device over an $I^2C$ bus, in accordance with an embodiment of the present invention.

FIG. 2 is a flow chart that schematically illustrates a method for securing access to peripheral device 28 over I²C bus 32, in accordance with an embodiment of the present invention. The method begins with processor 44 of security device 36 monitoring the transactions on I²C bus 32 using interface 40, at a monitoring step 50.

At a transaction detection step 54, processor 44 identifies a transaction in which a host 24 attempts to access peripheral 28. Processor 44 checks whether the transaction is authorized or not, at a checking step 58. For example, processor 44 may check whether the transaction violates some security policy that is stored in memory 48.

If the transaction is found authorized, processor 44 allows the transaction to proceed normally, at a granting step 62. Otherwise, if the transaction is found unauthorized, processor 44 disrupts the transaction by forcing dummy "0" values on the SCL and/or SDA lines of bus 32, at a disruption step 66.

Securing Access to Peripheral Device Over SPI Bus

FIG. 3 is a block diagram that schematically illustrates a secured system 70, in accordance with an alternative embodiment of the present invention. In the example of FIG. 3, system 70 comprises a host device 74, a peripheral device 78 and a security device 86, all connected to an SPI bus 82.

Security device 86 identifies and disrupts transactions in which host 74 attempts to access peripheral 78 without authorization. In the present example, security device 86 comprises an interface 90 for connecting to SPI bus 82, a processor 94 that is configured to carry out the disclosed techniques, and a memory 98 that is configured to store one or more security policies enforced by processor 94.

The security policies that distinguish between authorized and unauthorized transactions, and the manner in which processor 94 of security device 86 identifies unauthorized transactions, are essentially similar to those described above with regard to system 20. The techniques described below differ from those described above in the way security device 86 forces dummy values on bus 82 for disrupting unauthorized transactions.

SPI bus 82 comprises a clock (CLK) line, and two data lines referred to as Master-Out Slave-In (MOSI) and Master-In Slave-Out (MISO). The CLK, MISO and MOSI lines are common to all devices (in the present example devices 74, 78 and 86). In addition, each slave device is selectable using a dedicated Chip-Select (CS) line. In the present example, host 74 selects peripheral 78 using a CS line denoted CS2#, and selects security device 86 using a CS line denoted CS1#.

Host 74, being a master, is connected to all CS lines. The peripheral devices, on the other hand, are slaves and therefore each peripheral is only connected to its own CS line. Typically, host 74 initiates a transaction by selecting the desired peripheral using the respective CS line, and then communicates with the device using the CLK, MOSI and MISO lines. The MOSI line is used for transmitting from the host to the peripheral, and the MISO line is used for transmitting from the peripheral to the host.

Security device 86, unlike a conventional SPI slave, is defined as a slave but is nevertheless able to drive all CS lines. As can be seen in FIG. 3, interface 90 of security device 86 is configured to drive the CS2# line in parallel to host device 74. When the system comprises multiple peripheral devices 78 having respective CS lines, security device 86 is typically configured to drive any of the CS lines in parallel to host device 74.

In some embodiments, the system is designed such that when host 74 and security device 86 drive a CS line with opposite logical values, the logical value driven by security device 86 will override the logical value driven by host 74.

In other words, if host 74 and security device drive a CS line with opposite logical values, the peripheral will receive and act according to the logical value driven by security device 86.

Overriding the CS line is another example of blocking the transaction on the bus in order to disrupt an unauthorized transaction between a host and a peripheral. The above overriding mechanism can be implemented in various ways. The description that follows refers to the CS2# line used for selecting peripheral 78, but the same mechanisms apply when using multiple peripherals and multiple respective CS lines.

In one embodiment, the line driver that drives the CS2# line in interface 90 by security device 86 is stronger than the line driver that drives the CS2# line by host 74. In an alternative embodiment, a serial resistor 100 may be inserted in the CS2# line, at the output of host 74. Resistor 100 attenuates the output of the CS2# line driver of host 74, relative to the output of the CS2# line driver of security device 86. Further alternatively, security device 86 may be configured to override host 74 in driving the CS2# line in any other suitable way.

Processor 94 of security device 86 may identify an unauthorized transaction in any suitable way, by monitoring the CS#, CLK, MISO and/or MOSI lines of SPI bus 82. In some embodiments, upon identifying a transaction in which host attempts to access a certain peripheral 78 without authorization, processor 94 of security device 86 disrupts the transaction by de-asserting the CS line of that peripheral. Since security device 86 is configured to override host 74 in driving the CS2# line, the peripheral will be de-selected, and the transaction will be disrupted. On the other hand, upon deciding that a transaction is authorized, processor 94 deactivates its CS2# line driver, thereby allowing the host to access peripheral 78 without interruption.

FIG. 4 is a block diagram that schematically illustrates a secured system 110, in accordance with another embodiment of the present invention. System 110 is also based on SPI bus 82, similarly to system 70 of FIG. 3. In system 110, however, instead of overriding the CS line, security device 86 disrupts unauthorized transactions by forcing dummy values on the CLK line, MISO line and/or MOSI line.

In the present example, system 110 is configured such that security device 86 overrides host 74 in driving the CLK line, MISO line and/or MOSI line. As can be seen in the figure, serial resistors 100 are inserted in the CLK, MISO and MOSI lines for this purpose. Since the CS2# line is not overridden in this example, no serial resistor is inserted therein.

In alternative embodiments, the overriding mechanism can be implemented by making the line drivers of the CLK, MISO and/or MOSI lines in security device 86 stronger than the corresponding line drivers in host 74.

In other embodiments, hybrid schemes that involve both overriding the CS line (as in FIG. 3) and overriding the CLK, MISO and/or MOSI lines (as in FIG. 4) are also feasible.

Securing access to peripheral device by overriding dedicated point-to-point signals The signals of a bus, e.g., SPI, can be divided into shared signals and dedicated signals. A shared signal is a signal that is connected in parallel to multiple (e.g., all) peripheral devices on the bus. Examples of shared SPI signals are data (MOSI and MISO) and clock (CLK) signals. A dedicated signal is a signal that is dedicated to a specific peripheral. One example of a dedicated signal which is part of the bus is a Chip Select (CS) signal. In addition, the bus may be augmented with out-of-band dedicated signals, for example, Write Protect (WP) signal (when the peripheral comprises memory device). A dedicated signal may also be referred to as a Point-To-Point (PTP) line.

In some embodiments, one or more of the dedicated signals pass through security device 86 before reaching the peripheral devices. The shared signals, in contrast, are routed conventionally to the peripheral devices and do not pass through the security device. This interconnection scheme enables the security device to secure the peripheral devices effectively, as will be described below.

Figure 5:
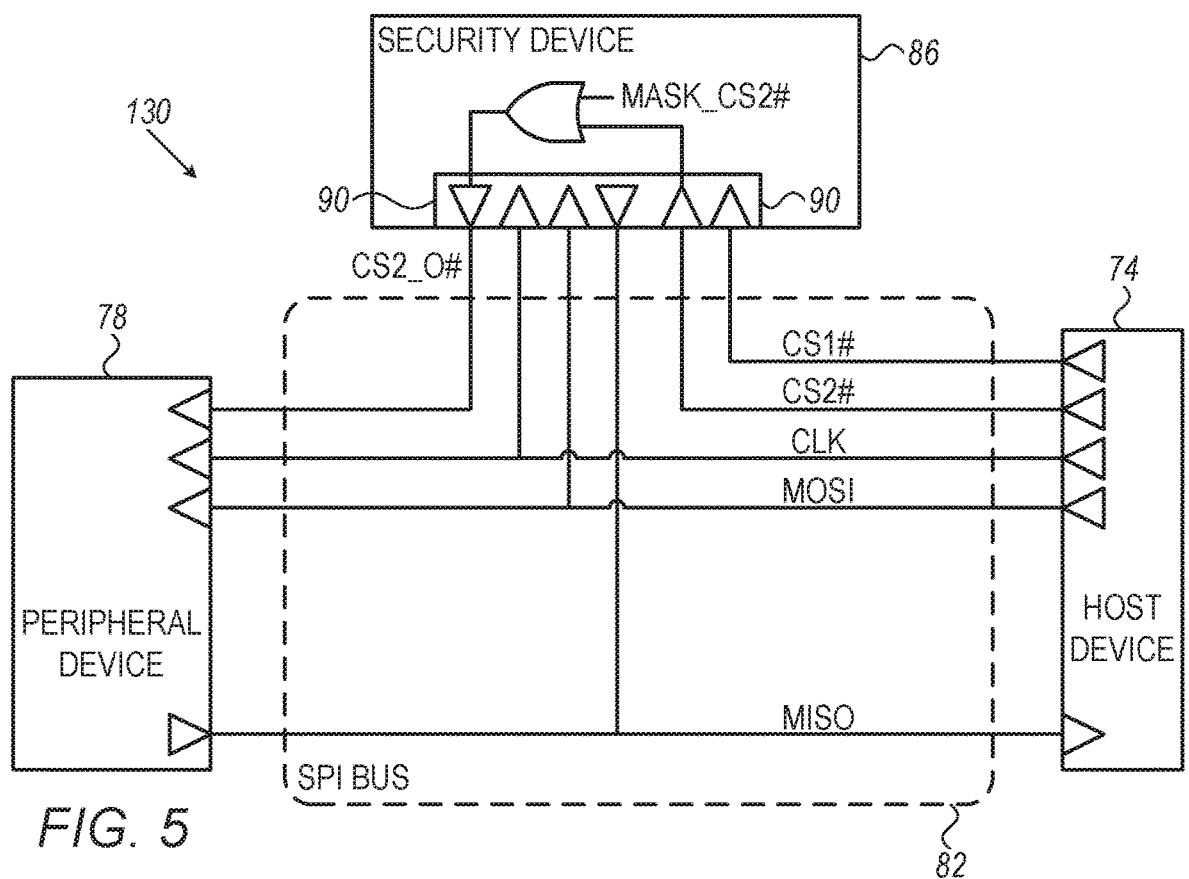

FIG. 5 is a block diagram that schematically illustrates a secured system 130, in accordance with an alternative embodiment of the present invention. The system similar to system 70 of FIG. 3. In the present embodiment, however, the CS2# signal does not drive the input of peripheral 78 directly. Instead, the CS2# line from host 74 is input to the security device 86, and in turn, security device 86 drives a signal denoted CS2_O# that is connected to the input of peripheral 78.

In the present embodiment, the CS2# signal serves as an example of a dedicated PTP signal that passes through the security device en-route to the peripheral device being protected. As can be seen in the figure, the shared signals (MOSI, MISO and CLK) are unbroken between host 74 and peripheral 78.

Security device 86 is configured to disrupt transactions between host 74 and peripheral 78, by selectively enabling the CS2# signal to arrive at the peripheral, or preventing the CS2# signal from reaching the peripheral. This selection is performed, in the example of FIG. 5, by asserting or de-asserting a control signal denoted MASK_CS2#.

Figure 6:
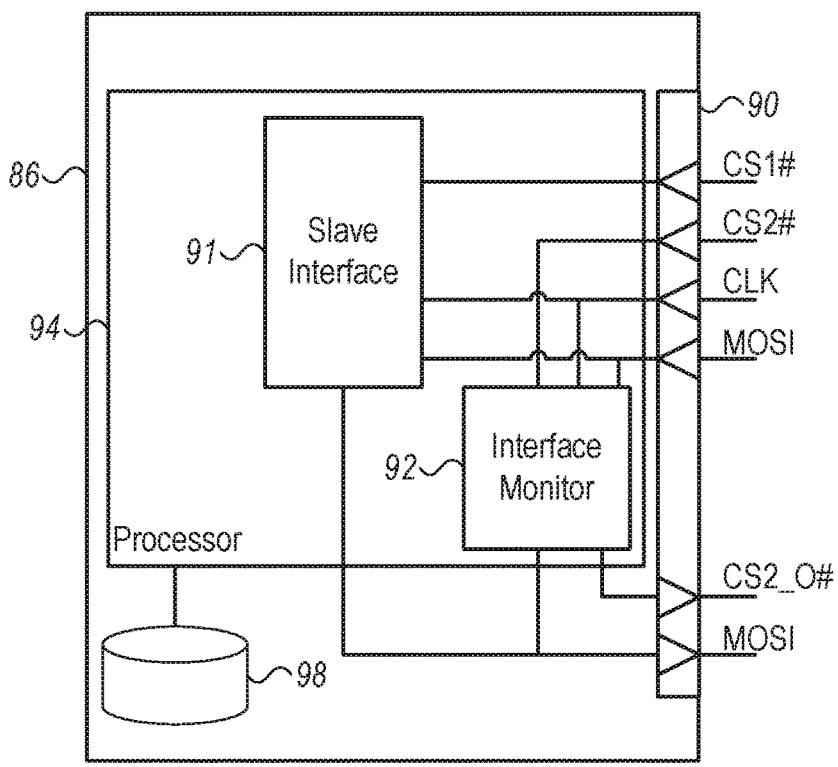
FIG. 6 is block diagram that schematically illustrates security device, in accordance with an embodiment of the present invention.

FIG. 6 is a block diagram of security device 86 of system 130 described in FIG. 5, in accordance with an embodiment of the present invention. In the present example, security device 86 comprises an interface 90 for connecting to SPI bus 82, a processor 94 that is configured to carry out the disclosed techniques, and a memory 98 that is configured to store one or more security policies enforced by processor 94. Processor 94 comprises slave interface logic 91 and Interface Monitor Logic (IML) 92. Slave interface logic 91 handles the communication between security device 86 and host 74. IML 92 monitors, controls and selectively overrides the access of host 74 to peripheral 78.

In one embodiment, security device 86 identifies and disrupts transactions in which host 74 attempts to access peripheral 78 on SPI bus 82 without authorization. It can be understood from FIGS. 5 and 6 that any security feature that is possible in the system described in FIG. 3, can also be implemented in the system of FIG. 5.

In some embodiments, IML 92 (in processor 94 of security device 86) comprises a set of registers, or other suitable data structure, which defines which transactions are authorized and which transactions are unauthorized. For example, when peripheral 78 is an SPI Flash device, the definition may specify commands and associated address ranges that are regarded as authorized. With this sort of definition, security device 86 allows only transactions that match a specified command and address a corresponding address range. A transaction that does not match the definition is disrupted. In an embodiment, specification of an address range is not mandatory—Some commands, e.g., chip-erase, do not specify addresses.

Additionally or alternatively to disrupting the transaction, IML 92 may issue an alert to a higher software layer, or initiate any other suitable responsive action, e.g., reset the system or part of the system, take over control of the Flash device and restore a golden image from an alternative location, or even halt the system permanently and prevent any future boot.

In some embodiments, the specification of authorized and unauthorized transactions follows a "whitelist" logic, i.e., security device 86 allows only transactions that are explicitly specified in IML 92 as authorized. Unspecified transactions are rejected and disrupted.

In the embodiments described above, the security device is connected to the bus and configured as an additional slave device. In other embodiments, however, the security device may be connected and configured as a master device. Such implementations are applicable, for example, in bus protocols that support multi-master capability.

Protection Against Unauthorized Transactions by Security Device Responding on Behalf of Peripheral Device In another embodiment, security device 86 responds to selected host transactions on behalf of peripheral 78. The description that follows refers mainly to the configuration of FIGS. 5 and 6 above, purely by way of example. Generally, the disclosed technique is not limited to this specific system configuration and may be applied using any other configuration, e.g., the configuration of FIG. 3 or FIG. 4 above.

In an example embodiment relating to the configuration of FIGS. 5 and 6, upon detection of a read command form a certain address zone within the address space of peripheral 78, IML 92 can force CS2_O# 'high' and serve the host read command (or a portion of the read command) from internal memory 98 of the security device. Host 74 is typically unaware that the response does not originate from the peripheral. In some embodiments this scenario is also applicable to system 110 of FIG. 4, for example when the MISO signal is overridden by the security device.

One example use-case of this mechanism is a system in which peripheral 78 comprises an SPI Flash memory device, and security device 86 is configured to override part of the Flash address space and in this manner provide a secured Flash emulation for that address zone. For example, security device 86 may comprise a TPM that uses IML 92 to override the Flash address zone that contains the initial host boot code (the first boot commands which are fetched by the host on boot). The TPM may override this Flash address zone with self-contained authenticated initial boot code that, for example, authenticates the rest of the code before jumping to it.

In some embodiments, security device 86 further comprises a master interface to the SPI Flash device. In addition, security device 86 may comprise a suitable interface and circuitry to maintain host 74 at reset while accessing to the SPI Flash device, typically as part of the system boot process. Security device 86 can be, for example, an embedded controller (EC), a super I/O (SIO) or a baseboard management controller (BMC) device.

Figure 7:
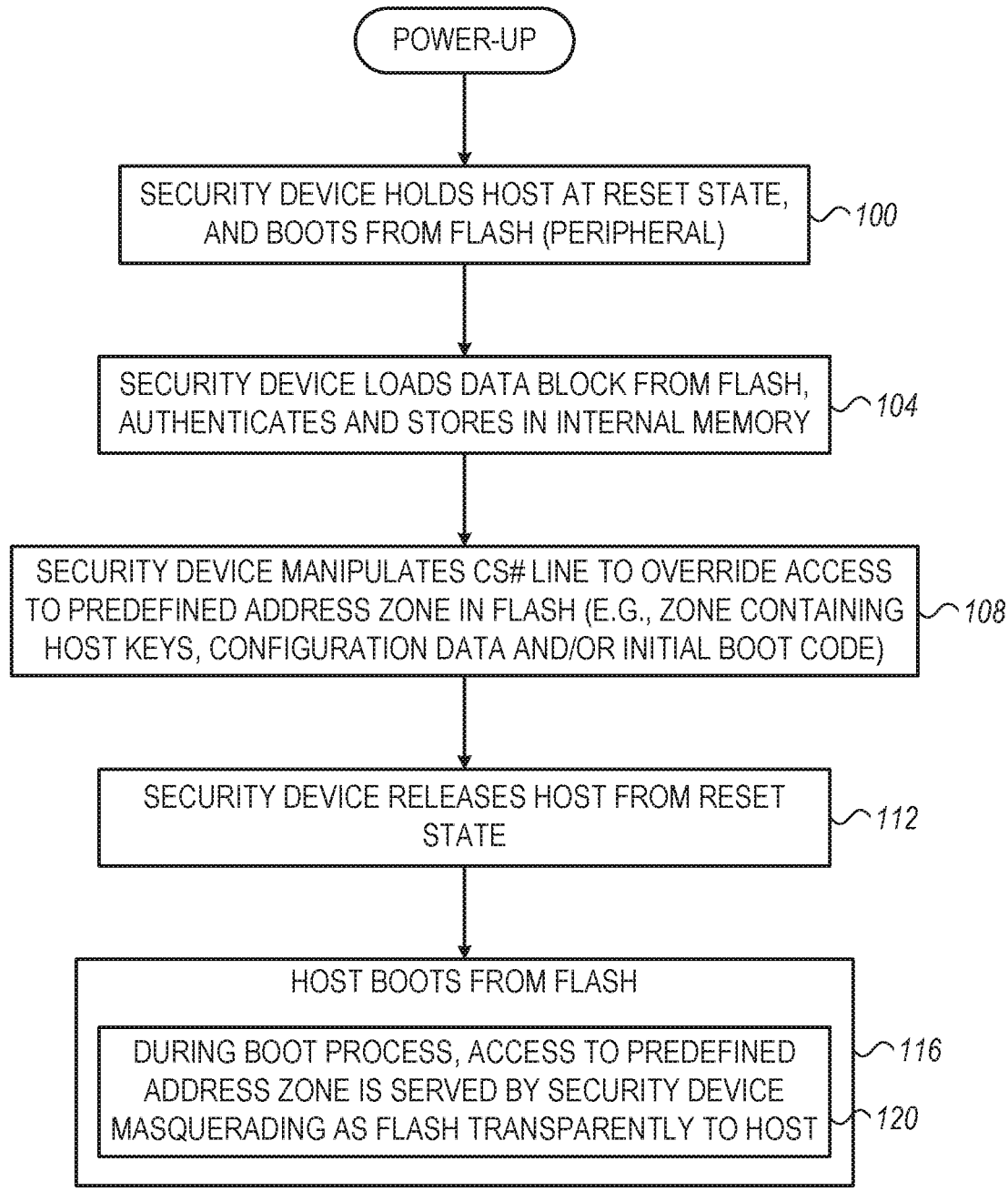
FIG. 7 is a flow chart that schematically illustrates a method for secure booting of a host device, in accordance with an embodiment of the present invention.

FIG. 7 is a flow chart that schematically illustrates an example of such a secure boot process, in accordance with an embodiment of the present invention. The method begins at power-up, i.e., assertion of system power. At a reset holding step 100, security device 86 holds host 74 at reset and boots, optionally from SPI Flash (peripheral 78). At an (optional) initial loading step 104, security device 86 loads a data block from the SPI Flash, verifies the authenticity of the data block and stores internally in memory 98.

At an overriding step 108, security device 86 configures IML 92 to override access to at least one predefined address zone in the SPI Flash (peripheral 78 in the present example). The address zone in question may contain, for example, one or more keys, configuration data and/or an initial boot block of host 74.

At a reset releasing step 112, security device 86 releases the host from reset. Thus, at a booting step 116, host 74 begins its boot process. As part of the boot process, at a zone accessing sub-step 120, access to the predefined address zone is served by security device 86 from internal memory 98.

In this manner, sensitive information such as keys, configuration data and/or initial boot code, can be served securely from the security device. Host 74 is unaware of the fact that this information is served from the security device and not from the SPI Flash.

The method of FIG. 7 is depicted as an example for demonstrating how a security device can override access to a predefined address zone of a peripheral device. In alternative embodiments, any other suitable method can be used for this purpose. Alternatively to masquerading as the SPI Flash device, the security device may protect the Flash device (or other peripheral device) by overriding and/or disrupting unauthorized transactions in any other suitable way.

Moreover, overriding of unauthorized transactions is not limited to protecting a specific predefined address zone. For example, overriding may be triggered based on the returned data from the protected peripheral, or on the SPI command code. For example, the security device may enforce a security policy that disables programming, erasure, write-enabling, status/configuration and/or any other command or functionality of the Flash device. An example specification of SPI Flash commands and instructions is specified by Winbond Electronics Corporation, in "SPI Flash—3V Serial Flash Memory with Dual/Quad SPI and QPI," Aug. 24, 2015.

As another example, in the method of FIG. 7 the sensitive information resides in the Flash device to begin with, and is read by the security device as part of the boot process. In alternative embodiments, the sensitive information may be stored initially in the security device (either in addition to or instead of in the Flash memory). In such embodiments, there is no need for reading this information from the Flash device to the security device.

As yet another example, the method of FIG. 7 is described with reference to an SPI bus. In alternative embodiments, a security device may override access to a predefined address zone of a peripheral device in other buses and protocols, using any of the dedicated signals (if any) and/or the shared signals of the bus. The $I^2C$ bus, for example, is a pull-up bidirectional bus that is designed to support multiple slave devices and multiple master devices. As such, the protocol has an embedded mechanism to handle contention between devices. For example, when an $I^2C$ device detects '0' on the SDA line while trying to set '1' (pull-up), the device assumes contention and releases the bus until the next transaction. In one embodiment, an security device (e.g., device 36 of FIG. 1) is configured to overlap some of the address space of another peripheral slave (e.g., device 28 of FIG. 1). The security device can, for example, be configured to answer the same data as expected from the other peripheral. If the security device detects a data mismatch (e.g., attempts to pull-up '1' but senses '0' on the SDA line), the security device may initiate responsive action (e.g., cause a stop condition, drive '0' on one or more data lines, set an endless clock stretching, or any other suitable action). This technique may utilize a conventional I²C slave device (without hardware changes in the physical layer) to monitor a device down to the data level.

In yet another embodiment, security device 86 (using ILM 92) also monitors the data phase of the SPI address. Upon recognizing a data mismatch, the security device may initiate responsive action, e.g., by chopping the transaction, resetting the system, locking access to keys or, any other suitable action.

In an example scenario, security device 86 holds a signature or a digest of a certain code section stored in the SPI Flash. The security device monitors the accesses of host 74 to the SPI Flash while calculating the signature or hash of this code section in the background. If a wrong signature, hash or SPI fetch sequence is detected, security device 86 can initiate suitable responsive action.

In yet another embodiment, the security device can monitor more than one peripheral 78 on bus 82 and verify, for example, that the access order to different devices is as expected.

In yet another embodiment, security device 86 uses one or more signals (other than CS) to restrict access to peripheral 78 or to enforce a certain system state upon detection of an authorized transaction with peripheral 78. Non-limiting examples for such signals comprise:

Any of the signals demonstrated with reference to the system of FIG. 4.
A write-protect signal of a Flash memory.
Control Reset signal.
Control power management signal.
Control power to one or more devices.
Disable system communication (e.g., by disabling a network interface controller (NIC)).
System reset.

Additionally or alternatively, such signals, or any other suitable signals, can be used for generating a system alert and/or for initiating any suitable responsive action.

Disruption of Unauthorized SPI Flash Transactions by Extending CS Duration

FIG. 8 is a block diagram that schematically illustrates a secured system 132 in which multiple devices communicate over an SPI bus, in accordance with another embodiment of the present invention. System 132 of FIG. 8 is similar to system 130 of FIG. 5 above, with the exception of an additional AND gate 134 and an additional control signal denoted MASK_LOW_CS2. Also, in the example of FIG. 8 peripheral device 78 is an SPI Flash device. As explained above with reference to FIG. 5, security device 86 is configured to disrupt transactions between host 74 and peripheral 78 by selectively enabling the CS2# signal to arrive at the peripheral, or preventing the CS2# signal from reaching the peripheral. In the example of FIG. 5, this selection is performed by asserting or de-asserting the control signal denoted MASK_CS2#.

Consider an embodiment in which peripheral 78 is an SPI Flash device. In this embodiment, setting the Flash device CS signal (CS2_O# in the figure) to "low" selects the Flash device, and setting the CS signal to "high" de-selects the Flash device.

In the example of FIG. 5 above, security device 86 is configured to disrupt a transaction between host 74 and Flash 78 by asserting the MASK_CS2# signal to "high" before the end of the transaction. This operation sets the Flash device CS signal to "high" (and thus de-selects the Flash device) before the end of the transaction.

In some cases, however, the above technique may fail to disrupt some unauthorized transactions. Consider, for example, a case in which an authorized transaction differs from an unauthorized transaction only in the last bit. For example, in one embodiment the command op-code 0x60 is authorized, but the command op-code 0x61 is not authorized and should be disrupted. In such a case, de-selecting the Flash device's CS signal after the last bit is sampled will not disrupt the transaction.

The alternative embodiment of FIG. 8 overcomes this problem. In the configuration of FIG. 8, the MASK_LOW_CS2 signal is normally set to "high". In response to detecting an unauthorized transaction, security device 86 is configured to set the MASK_LOW_CS2 to "low". This operation extends the duration of the CS signal of Flash device 78 beyond the actual end of the transaction. As a result, Flash device 78 is capable of detecting that the length of the transaction is longer than the expected length by one or more clock cycles, and refraining from executing the transaction.

When using the technique of FIG. 8, security device 86 may extend the duration of the CS signal by any suitable length, e.g., by a single clock cycle, by several clock cycles, or indefinitely (e.g., until the next reset or power-up).

In the example implementation of FIG. 8 (and in the implementation of FIG. 5 above), security device 86 communicates with host device 74 over SPI bus 82, by selecting the security device using CS1#. In alternative embodiments, it is not mandatory for the security device to have a separate CS signal. The security device may communicate with the host device using any other suitable interface, direct or indirect. In some embodiments there may be no interface at all between the host device and the security device (as long as the security device is able to monitor SPI transactions and secure the bus in the absence of such an interface).

Monitoring SPI Flash Transactions Using Transaction-Group Counters

In some embodiments, processor 94 of security device 86 specifies one or more groups of SPI transactions, and maintains an on-going count of the number of SPI transactions in each group. Each group may comprise one or more SPI transactions that meet some predefined criterion.

In one example, one group comprises the various types of read transactions, and another group comprises the various types of write transactions. In another example, one group comprises the various types of authorized transactions, and another group comprises the various types of unauthorized transactions. Alternatively, any other suitable grouping can be used. Processor 94 may define any suitable number of groups. The groups need not necessarily include all the possible transaction types. The grouping may be user-configurable.

In an embodiment, security device 86 comprises multiple hardware-implemented or software-implemented counters (referred to herein as "transaction-group counters"). Processor 94 assigns a respective counter to each transaction group. A given counter is typically resettable by the software of processor 94, e.g., on system reset or power-up, after reading the counter, after the counter has reached a certain threshold, or on any other suitable condition or event.

Generally, a certain transaction type may appear in more than one group, meaning that a transaction may cause incrementing of multiple counters. Consider, for example, an embodiment in which one group comprises all types of write transactions, a second group comprises all types of read transactions, and a third group comprises all unauthorized transactions. In this example, however, some types of write transactions are authorized and other types of write transactions are unauthorized. Three counters are defined for the three groups. In this embodiment, in response to identifying an unauthorized write transaction, processor 94 will increment both the first counter and the third counter. Alternatively, the unauthorized transactions may be omitted from any other counting group.

Processor 94 increments the counters continuously during normal operation. Thus, at a given time, each transaction-group counter indicates the number of SPI transactions belonging to the group that occurred up to the given time. This information can be used, by security device 86 or otherwise, for profiling the operation of host device 74, for detecting anomalous behavior of host device 74 that might indicate a security threat, or for any other suitable purpose. In some embodiments, processor 94 may issue an alert or trigger some other responsive action if the counter values indicate a suspicious behavior profile of host device 74 (e.g., an unexpectedly high number of write or erase transactions).

FIG. 9 is a flow chart that schematically illustrates a method for monitoring SPI transactions using transaction-group counters, in accordance with an embodiment of the present invention. The method begins with processor 94 dividing the various types of SPI transactions into two or more groups, and assigning a respective transaction-group counter to at least one of the groups, at a grouping and assignment step 140.

At a transaction identification step 144, processor 94 identify an SPI transaction between host device 74 and SPI Flash 78 on SPI bus 82. At a classification step 148, processor 94 identifies the transaction group to which the identified SPI transaction group belongs.

At an authorization checking step 152, processor 94 checks whether the identified SPI transaction is authorized or not. If authorized, processor 94 allows the transaction to complete, at a transaction acceptance step 156. If unauthorized, processor 94 disrupts the transaction, at a transaction disruption step 160.

At a counter incrementing step 164, processor 94 increments the transaction-group counter corresponding to the group identified at step 148. The method then loops back to step 144 above, and processor 94 continues to monitor SPI bus 82 for subsequent transactions.

The flow of FIG. 9 is an example flow depicted purely for the sake of conceptual clarity. Any other suitable flow can be used in alternative embodiments. For example, in some embodiments processor 94 does not necessarily disrupt an unauthorized transaction. Instead, processor 94 may initiate a suitable responsive action such as triggering an alert or entering an alert mode, another example, the transaction-group counters mechanism may be used without necessarily checking for unauthorized transactions, i.e., without necessarily regarding any transaction as unauthorized.

Supporting SPI Flash Modes in Security Device

In some embodiments, SPI Flash device 78 supports one or more dedicated operational modes. Entry into a dedicated mode and exit from a dedicated mode is performed in response to dedicated SPI commands from the host device. Some SPI transactions may have different formats or interpretations depending on whether the SPI Flash device is in a dedicated mode or not. In some embodiments, processor 94 of security device 86 is aware of, and supports, the dedicated modes supported by SPI Flash 78.

One example of a dedicated mode is a "continuous read" mode (also referred to as XIP mode) described, for example, in a Data Sheet entitled "W25Q257FV SPI Flash—3V 256M-Bit Serial Flash Memory with Dual/Quad SPI & QPI," Winbond Electronics Corp., Nov. 13, 2015. When operating in this mode, the Flash device expects to receive only read transactions, and therefore the host device does not send the read op-code with every command. Additionally or alternatively, processor 94 of security device 86 may support any other suitable dedicated modes.

In some embodiments, processor 94 supports a certain dedicated mode by (i) recognizing entry into the mode by identifying (on SPI bus 82) the SPI transaction in which host device 74 instructs Flash device 78 to enter the mode, (ii) recognizing exit from the mode by identifying (on SPI bus 82) the SPI transaction in which host device 74 instructs Flash device 78 to exit the mode, and (iii) matching the security device operation depending on whether the Flash device operates in the mode or not.

In some embodiments, upon identifying entry into a dedicated mode, processor 94 implements the actual logic of that mode, similarly to the logic implemented in Flash device 78. In these embodiments, processor 94 continues to monitor SPI transactions while in the dedicated mode and adapts the transaction interpretation to the mode definition. In the "continuous read" mode, for example, processor 94 assumes that an omitted read-command op-code is the same as the previous transaction, and starts monitoring/analyzing the address bits from the beginning of the transaction (from the first cycle after CS# goes low).

In other embodiments, upon identifying entry into a dedicated mode, processor 94 suspends its monitoring of SPI transactions until the mode is exited from. This implementation is simpler to implement, because processor 94 is only required to identify entry into and exit from the mode, and not implement the entire mode logic. This implementation is applicable for dedicated modes in which only authorized transactions (and thus no disruptions of transactions) are expected. For example, in embodiments in which security device 86 is only required to protect against unauthorized write transactions, it is acceptable to suspend monitoring when entering a "continuous read" mode.

Manipulation of Serial Flash Discoverable Parameters (SFDP) in Security Device

The Serial Flash Discoverable Parameters (SFDP) standard specifies the description of functional and feature capabilities of Serial Flash devices in a standard set of internal parameter tables. These parameter tables can be interrogated by host system software.

SFDP is specified in the JEDEC JESD216 family of standards, and is described, for example, in an Application Note entitled "SFDP Introduction—Serial Flash Discoverable Parameter Structure," Marconix International Co., Ltd., 2011; and in a Technical Note entitled "Serial Flash Discovery Parameters for MT25Q Family—Introduction," Micron Technology Inc., 2012.

In some embodiments, processor 94 of security device 86 is configured to obtain the SFDP from Flash device 78 before host device 74 first communicates with the Flash device. Processor 94 then modifies the SFDP and presents ("exposes") the modified SFDP to host device 74. The description that follows refers mainly to SFDP for the sake of clarity, but the disclosed techniques can be used with any other sort of transaction that queries for capabilities of a memory device.

In some embodiments, in modifying the SFDP, processor 94 adds to the SFDP one or more capabilities that are not genuinely supported by Flash device 78. Being presented with the modified SFDP, host device 74 may attempt to use the added capabilities that are not supported by the Flash device. Typically, processor 94 identifies this attempt as part of monitoring the SPI transactions on SPI bus 82, and security device 86 implements the capabilities in question on behalf of the Flash device. One example of such a capability is support of Replay-Protected Monotonic Counters (RPMC), as described, for example, in U.S. patent application Ser. No. 16/503,501, entitled "RPMC Flash Emulation," whose disclosure is incorporated herein by reference. Alternatively, any other suitable capability can be added to the SFDP.

In some embodiments, in modifying the SFDP, processor 94 omits from the SFDP one or more capabilities that are supported by Flash device 78, in order to hide the support from host device 74. For example, processor 94 may hide the support of modes such as Double Data rate (DDR), Quad Peripheral Interface (QPI) and "continuous read" (XIP), or any other suitable capability. Hiding the fact that Flash device 78 supports a certain capability may be useful, for example, for simplifying the implementation of secure device 86. When a capability is hidden from the host device, the secure device is not required to support it (but is still typically required to identify the related SPI transactions, in order to disrupt them if they do appear on the bus).

In various embodiments, processor 94 may obtain the actual SFDP from Flash device 78 at different times. For example, a non-volatile memory in security device 86 may be pre-programmed with the actual SFDP of Flash device 78, e.g., during system integration or testing. As another example, processor 94 may retrieve the SFDP from Flash device 78 during the power-up sequence, before the host device accesses the Flash device.

Subsequently, when host device 74 issues an SFDP read transaction, processor 94 identifies the command op-code, disrupts the transaction (e.g., by setting the CS2_O# signal of FIG. 5 or FIG. 8 to "high"), and then completes the transaction by supplying the modified SFDP to host device 74 over the MISO line of bus 82. The host device has no way of detecting that the SFDP is provided by the security device and not by the Flash device.

Secure Mediation of Write/Erase Transactions By Security Device

In some embodiments, security device 86 does not merely monitor transactions on the SPI bus, but rather mediates between the host device and the Flash device. In these embodiments, security device 86 receives selected SPI commands (e.g., write commands and erase commands) from host device 78, and verifies that the commands are authorized. Only if authorized, security device 86 completes the transactions, i.e., performs the commands in Flash device 78 on behalf of host device 74.

Typically, the verification process in secure device 86 involves some evaluation of the data to be written to the Flash device. In some embodiments the evaluation involves some cryptographic operation, e.g., authentication of a signature with which the data is signed. Verification tasks of this sort typically require considerable computational effort, and are therefore less suitable for real-time on-the-fly verification (and possibly disruption) of transactions on the bus.

Figure 10:
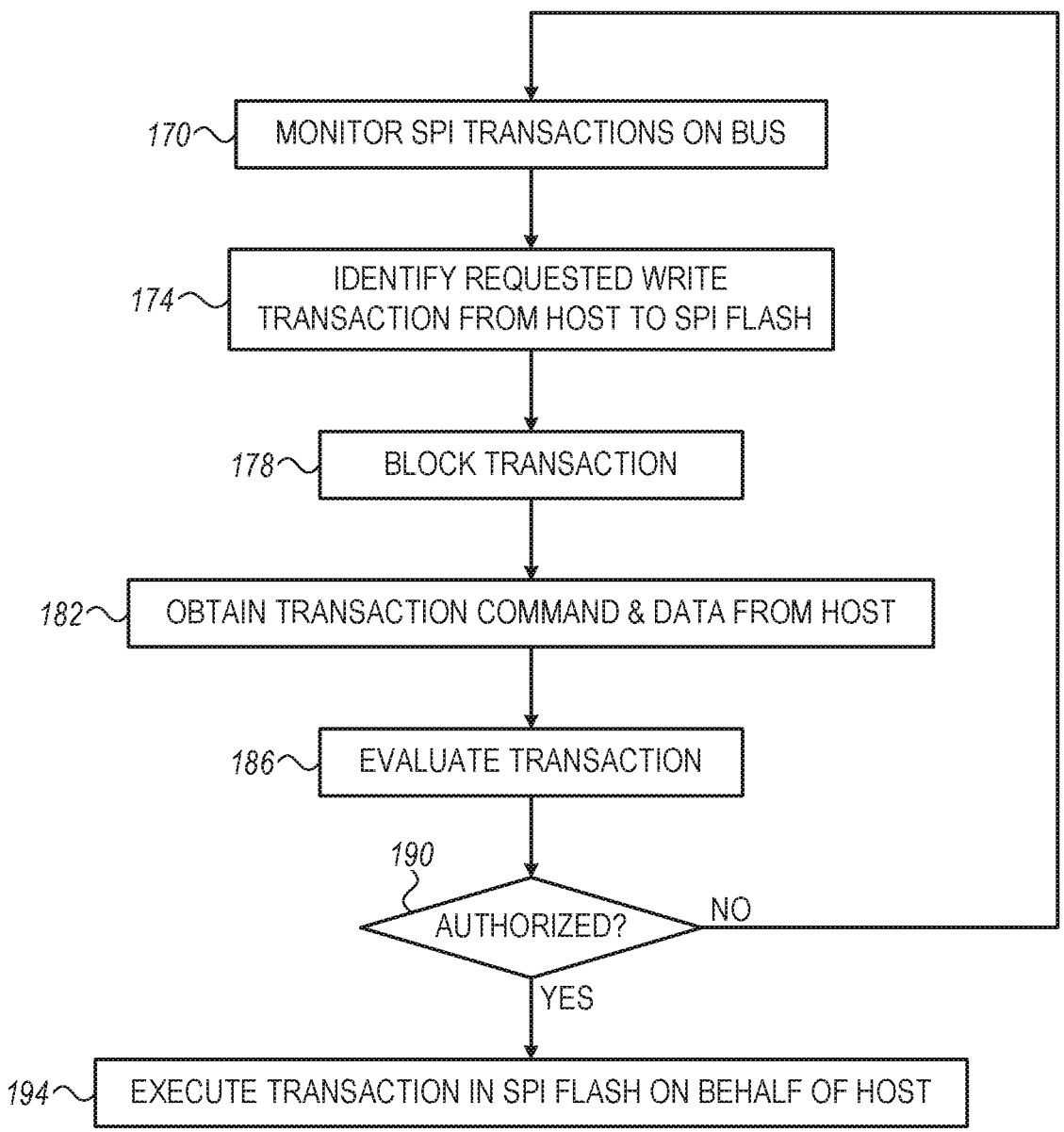
FIG. 10 is a flow chart that schematically illustrates a method for secure mediation of write/erase transactions between host and SPI Flash, in accordance with an embodiment of the present invention.

FIG. 10 is a flow chart that schematically illustrates a method for secure mediation of write/erase transactions between host and SPI Flash, in accordance with an embodiment of the present invention. The method begins with processor 94 of security device 86 monitoring transactions on SPI bus 82, at a monitoring step 170.

At an identification step 174, processor 94 identifies a write transaction to Flash device 78, requested by host device 74. At a blocking step 178, processor 94 blocks the requested write transaction from being performed in the Flash device. At an obtaining step 182, processor 94 obtains the command and data of the write transaction from host device 74 (over the SPI bus or over any other suitable interface between the host device and the security device).

At an evaluation step 186, processor 94 evaluates the write transaction. As noted above, the evaluation may involve some cryptographic or other evaluation of the data to be written. If the verification is successful, i.e., if the write transaction is found to be authorized, processor 94 executes the write transaction in Flash device 78 on behalf of host device 74. If not, i.e., if the verification fails, the write transaction is not executed, and the method loops back to step 170 above.

The flow of FIG. 10 is an example flow depicted purely for the sake of conceptual clarity. Any other suitable flow can be used in alternative embodiments. For example, the flow of FIG. 10 refers to identification, blocking and conditional execution of a single transaction at a time. In alternative embodiments, multiple transactions may be blocked, evaluated and executed or denied en-bloc. For example, processor 94 may identify a sequence of write transactions that write a large body of data to memory. The processor may block these transactions (if also directed to flash), obtain the entire body of data (of the entire sequence of transactions) from the host device, and evaluate the entire body of data. Only if the entire body of data is authorized, processor 94 writes the data to the Flash device.

In the present context, the term "write transaction" refers to various types of transactions, e.g., Flash-program, Flash sector/block/chip-erase, write-enable, and various other commands that changes the state of the Flash device.

Typically, in order to support this method, security device 86 should be capable of initiating SPI transactions on bus 82. A suitable interface (bus 82 or other) should be provided between the security device and the host device. The host device should be prevented from sending transactions over the SPI bus while the bus is under control of the security device.

The configuration of systems 20, 70, 110, 130 and 132 of FIGS. 1, 3-6 and 8 and the configurations of the various system elements such as security devices 36 and 86 and buses 32 and 82, are example configurations that are depicted purely for the sake of conceptual clarity. In alternative embodiments, any other suitable configurations can be used.

For example, the figures show only a single peripheral device and a single host device for the sake of clarity. In some embodiments, the system may comprise two or more peripheral devices and/or two or more host devices. The embodiments described herein refer to the $I^2C$ and SPI buses by way of example. In alternative embodiments, the disclosed techniques can be implemented, mutatis mutandis, with any other suitable type of bus.

The SPI-related embodiments described herein refer mainly to single-bit SPI mode, for the sake of clarity. In alternative embodiments, the disclosed techniques can also be used with other SPI modes such as Dual SPI, Quad SPI, QPI and DDR modes. The disclosed techniques can also be applied to other modes such as continuous-read mode and others.

The different elements of systems 20, 70, 110, 130 and 132 may be implemented using any suitable hardware, such as in an Application-Specific Integrated Circuit (ASIC) or Field-Programmable Gate Array (FPGA). In some embodiments, some elements of security devices 32 and 86, e.g., processor 44 or processor 94, can be implemented using software, or using a combination of hardware and software elements. Memories 48 and 98 may be implemented using any suitable type of memory device, such as Random Access Memory (RAM) or Flash memory.

In some embodiments, processor 44 and/or processor 94 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the embodiments described above, the security device first detects an unauthorized transaction by monitoring the bus, and then disrupts the transaction. In alternative embodiments, the security device may disrupt a transaction without first detecting it on the bus, or without monitoring the bus at all. For example, the security device may override the chip-select (CS) line of a certain host, until or unless this host is authorized. Authorization may be carried out in any suitable manner, not necessarily using the same bus.

By way of non-limiting example, the methods and systems described herein can be used in various applications, such as in secure-memory applications, Internet-of-Things (IoT) applications, embedded applications or automotive applications, to name only a few.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A security device, comprising:
an interface for connecting to a bus that serves one or more peripheral devices, at least one of the peripheral devices being a memory device, wherein the bus comprises (i) one or more dedicated signals that are each dedicated to a respective one of the peripheral devices, and (ii) one or more shared signals that are shared among the peripheral devices served by the bus; and
a processor, which is connected to the bus in addition to the peripheral devices, and which is configured to hold a definition that distinguishes between authorized and unauthorized transactions with the memory device, to identify on the bus a transaction in which a bus-master device attempts to access the memory device, and, in response to identifying that the transaction is unauthorized in accordance with the definition, to initiate a responsive action including disrupting the transaction on the bus by disrupting a dedicated signal associated with the memory device.

2. The security device according to claim 1, wherein the dedicated signal is a Chip Select (CS) signal of the memory device, and wherein the processor is configured to disrupt the transaction by extending a duration in which the CS signal selects the memory device, beyond an actual end of the transaction, thereby causing the memory device to refrain from executing the transaction.

3. The security device according to claim 1, wherein the definition specifies the authorized transactions with the memory device, and wherein the processor is configured to initiate the responsive action in response to identifying that the transaction is not specified in the definition.

4. The security device according to claim 1, wherein the processor is configured to receive the transaction from the bus-master device, to verify whether the transaction is authorized, and, upon deciding that the transaction is authorized, to execute the transaction in the memory device.

5. The security device according to claim 4, wherein the processor is configured to receive the transaction as part of a sequence of transactions, and to verify whether the transaction is authorized as part of jointly verifying that the sequence of transactions is authorized.

6. The security device according to claim 1, wherein the transaction is a write transaction in which the bus-master device writes data to the memory device, and wherein the processor is configured to perform a cryptographic operation on the data, and to decide that the transaction is authorized in response to a success of the cryptographic operation.

7. A security device, comprising:
an interface for connecting to a bus that serves one or more peripheral devices, at least one of the peripheral devices being a memory device; and
a processor, which is connected to the bus in addition to the peripheral devices, and which is configured to hold a definition that distinguishes between authorized and unauthorized transactions with the memory device, to identify on the bus a transaction in which a bus-master device attempts to access the memory device, and to initiate a responsive action in response to identifying that the transaction is unauthorized in accordance with the definition,
wherein the processor is further configured to define one or more groups of transactions, to maintain one or more counters corresponding respectively to the groups, to monitor the bus, and, in response to identifying on the bus a given transaction between the bus-master device and the memory device, to increment a counter corresponding to a group to which the given transaction belongs.

8. A security device, comprising:
an interface for connecting to a bus that serves one or more peripheral devices, at least one of the peripheral devices being a memory device; and
a processor, which is connected to the bus in addition to the peripheral devices, and which is configured to hold a definition that distinguishes between authorized and unauthorized transactions with the memory device, to identify on the bus a transaction in which a bus-master device attempts to access the memory device, and to initiate a responsive action in response to identifying that the transaction is unauthorized in accordance with the definition, wherein the processor is further configured to identify whether or not the memory device is operating in a given operational mode, by identifying on the bus one or more mode-entry transactions that instruct the memory device to enter a given operational mode, and one or more mode-exit transactions that instruct the memory device to exit the given operational mode.

9. The security device according to claim 8, wherein the processor is configured to apply a first interpretation to one or more transactions when the memory device is operating in the given operational mode, and to apply a different second interpretation to the one or more transactions when the memory device is not operating in the given operational mode.

10. The security device according to claim 8, wherein the processor is configured to suspend initiation of responsive actions when the memory device is operating in the given operational mode.

11. A security device, comprising:
   an interface for connecting to a bus that serves one or more peripheral devices, at least one of the peripheral devices being a memory device; and
   a processor, which is connected to the bus in addition to the peripheral devices and is configured to:
      identify on the bus a transaction in which a bus-master device attempts to query for capabilities of the memory device;
      initiate a responsive action upon identifying the transaction; and
      respond to the bus-master device instead of the given peripheral device, with modified capabilities that are different from actual capabilities of the memory device.

12. The security device according to claim 11, wherein, upon identifying the transaction, the processor is configured to disrupt the transaction on the bus.

13. The security device according to claim 11, wherein the processor is configured to issue an alert upon identifying the transaction.

14. The security device according to claim 11, wherein the query comprises a Serial Flash Discoverable Parameters (SFDP) read command, and wherein the processor is configured to respond to the SFDP read command with modified SFDP.

15. The security device according to claim 11, wherein the processor is configured to obtain the actual capabilities from the memory device prior to the query from the bus-master device, and to modify the actual capabilities so as to produce the modified capabilities for responding to the bus-master device.

16. The security device according to claim 11, wherein the processor is configured to add to the modified capabilities a capability that is not supported by the memory device.

17. The security device according to claim 11, wherein the processor is configured to omit from the modified capabilities a capability that is supported by the memory device.

18. A security method, comprising:
   communicating over a bus using a security device, which is connected to the bus in addition to one or more peripheral devices, at least one of the peripheral devices being a memory device, wherein the bus comprises (i) one or more dedicated signals that are each dedicated to a respective one of the peripheral devices, and (ii) one or more shared signals that are shared among the peripheral devices served by the bus;
   holding in the security device a definition that distinguishes between authorized and unauthorized transactions with the memory device; and
   using the security device, identifying on the bus a transaction in which a bus-master device attempts to access the memory device, and, in response to identifying that the transaction is unauthorized in accordance with the definition, initiating a responsive action including disrupting the transaction on the bus by disrupting a dedicated signal associated with the memory device.

19. The security method according to claim 18, wherein the dedicated signal is a Chip Select (CS) signal of the memory device, and wherein disrupting the transaction comprises extending a duration in which the CS signal selects the memory device, beyond an actual end of the transaction, thereby causing the memory device to refrain from executing the transaction.

20. The security method according to claim 18, wherein the definition specifies the authorized transactions with the memory device, and wherein initiating the responsive action is performed in response to identifying that the transaction is not specified in the definition.

21. The security method according to claim 18, and comprising receiving the transaction from the bus-master device, verifying whether the transaction is authorized, and, upon deciding that the transaction is authorized, executing the transaction by the security device in the memory device.

22. The security method according to claim 21, wherein receiving the transaction comprises receiving the transaction as part of a sequence of transactions, and wherein verifying whether the transaction is authorized is performed as part of jointly verifying that the sequence of transactions is authorized.

23. The security method according to claim 18, wherein the transaction is a write transaction in which the bus-master device writes data to the memory device, and wherein verifying whether the transaction is authorized comprises performing a cryptographic operation on the data, and deciding that the transaction is authorized in response to a success of the cryptographic operation.

24. A security method, comprising:
   communicating over a bus using a security device, which is connected to the bus in addition to one or more peripheral devices, at least one of the peripheral devices being a memory device;
   holding in the security device a definition that distinguishes between authorized and unauthorized transactions with the memory device;
   using the security device, identifying on the bus a transaction in which a bus-master device attempts to access the memory device, and initiating a responsive action in response to identifying that the transaction is unauthorized in accordance with the definition; and
   defining one or more groups of transactions, maintaining in the security device one or more counters corresponding respectively to the groups, monitoring the bus, and, in response to identifying on the bus a given transaction between the bus-master device and the memory device, incrementing a counter corresponding to a group to which the given transaction belongs.

25. A security method, comprising:
   communicating over a bus using a security device, which is connected to the bus in addition to one or more peripheral devices, at least one of the peripheral devices being a memory device;

holding in the security device a definition that distinguishes between authorized and unauthorized transactions with the memory device;

using the security device, identifying on the bus a transaction in which a bus-master device attempts to access the memory device, and initiating a responsive action in response to identifying that the transaction is unauthorized in accordance with the definition; and identifying whether or not the memory device is operating in a given operational mode, by identifying on the bus one or more mode-entry transactions that instruct the memory device to enter a given operational mode, and one or more mode-exit transactions that instruct the memory device to exit the given operational mode.

26. The security method according to claim 25, and comprising applying a first interpretation to one or more transactions when the memory device is operating in the given operational mode, and applying a different second interpretation to the one or more transactions when the memory device is not operating in the given operational mode.

27. The security method according to claim 25, and comprising suspending initiation of responsive actions when the memory device is operating in the given operational mode.

28. A security method, comprising:

communicating over a bus using a security device, which is connected to the bus in addition to one or more peripheral devices, at least one of the peripheral devices being a memory device; and using the security device, identifying on the bus a transaction in which a bus-master device attempts to query for capabilities of the memory device, initiating a responsive action upon identifying the transaction, and responding to the bus-master device instead of the given peripheral device, by providing to the bus-master device modified capabilities that are different from actual capabilities of the memory device.

29. The security method according to claim 28, wherein initiating the responsive action comprises one or more of (i) disrupting the transaction on the bus and (ii) issuing an alert.

* * * * *